(12) United States Patent
Farhan et al.

(10) Patent No.: US 11,314,437 B2
(45) Date of Patent: Apr. 26, 2022

(54) CLUSTER BASED HARD DRIVE SMR OPTIMIZATION

(71) Applicant: Amazon Technologies, Inc., Seattle, WA (US)

(72) Inventors: Munif M. Farhan, Bellevue, WA (US); Darin Lee Frink, Lake Tapps, WA (US); Douglas Stewart Laurence, Mercer Island, WA (US)

(73) Assignee: Amazon Technologies, Inc., Seattle, WA (US)

(*) Notice: Subject to any disclaimer, the term of this patent is extended or adjusted under 35 U.S.C. 154(b) by 57 days.

(21) Appl. No.: 16/593,927

(22) Filed: Oct. 4, 2019

(65) Prior Publication Data
US 2020/0034066 A1    Jan. 30, 2020

Related U.S. Application Data

(62) Division of application No. 15/280,819, filed on Sep. 29, 2016, now Pat. No. 10,452,301.

(51) Int. Cl.
*G06F 3/06*      (2006.01)
*G06F 12/0866*      (2016.01)

(52) U.S. Cl.
CPC ........... *G06F 3/0647* (2013.01); *G06F 3/061* (2013.01); *G06F 3/0608* (2013.01); *G06F 3/0656* (2013.01); *G06F 3/0689* (2013.01); *G06F 12/0866* (2013.01); *G06F 2212/224* (2013.01); *G06F 2212/60* (2013.01)

(58) Field of Classification Search
CPC ...... G06F 3/0647; G06F 3/0608; G06F 3/061; G06F 3/0689; G06F 12/0866; G06F 3/0656; G06F 3/067
USPC ........................................................ 711/113
See application file for complete search history.

(56) References Cited

U.S. PATENT DOCUMENTS

| | | | |
|---|---|---|---|
| 5,432,922 A | 7/1995 | Polyzois et al. | |
| 2011/0153911 A1* | 6/2011 | Sprouse | G11C 11/5628 711/103 |
| 2012/0239853 A1 | 9/2012 | Moshayedi | |
| 2015/0169465 A1* | 6/2015 | Slepon | G06F 3/0659 711/103 |
| 2016/0321174 A1* | 11/2016 | Li | G06F 12/0866 |

* cited by examiner

*Primary Examiner* — Than Nguyen
(74) *Attorney, Agent, or Firm* — Klarquist Sparkman, LLP

(57) ABSTRACT

Technologies are provided for storing data by alternating the performance of data write operations using multiple clusters of storage devices. Data is written to internal buffers of storage devices in one cluster while data stored in buffers of storage devices in another cluster is transferred to the storage devices' permanent storages. When available buffer capacity in a cluster falls below a specified threshold, data write commands are no longer sent the cluster and the storage devices in the cluster transfer data stored in their buffers to their permanent storages. While the data is being transferred, data write commands are transmitted to other clusters. When the data transfer is complete, the storage devices in the cluster can be scheduled to receive data write commands again. A cluster can be selected for performing a given data write request by matching the attributes of the cluster to parameters of the data write request.

15 Claims, 11 Drawing Sheets

CLUSTER BASED HARD DRIVE SMR OPTIMIZATION

CROSS REFERENCE TO RELATED APPLICATIONS

This application is a Divisional of U.S. patent application Ser. No. 15/280,819, "CLUSTER-BASED STORAGE DEVICE BUFFERING," filed Sep. 29, 2016, which is hereby incorporated by reference in its entirety.

BACKGROUND

Storage device manufacturers continue to develop new ways to increase the capacity of storage devices. However, many recently-developed techniques for increasing storage capacity, such as shingled magnetic recording (SMR) also decrease data read and/or write access performance. In an attempt to mitigate this lower data access performance, some storage devices include internal buffers, such as on-device caches, where data can be stored temporarily for faster read/write operations. In an attempt to mitigate the lower write performance of SMR, some SMR hard drives use regions where data is first written using a non-SMR storage format (such as perpendicular magnetic recording (PMR)). Data that is buffered using such caches and/or temporary storage regions, is then moved to a permanent storage of the storage device at a later point in time.

DETAILED DESCRIPTION

Figure 1:
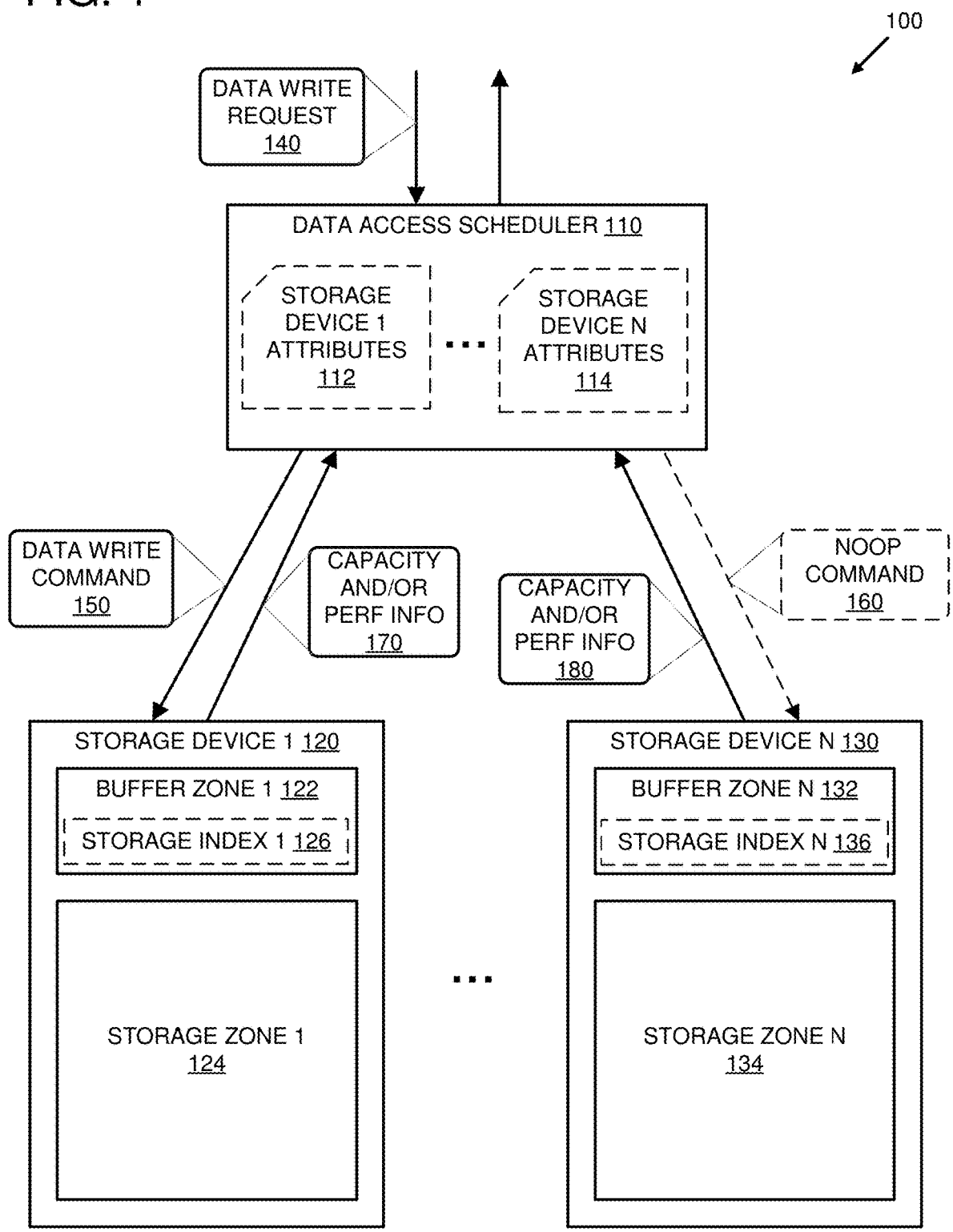
FIG. 1 is a system diagram showing an example system configured to alternate scheduling of data write commands to multiple storage devices based on buffer zones of the storage devices.

In some cases, storage devices with internal buffers can improve the performance of data write operations by writing data to internal buffers and then transferring the buffered data to permanent storage regions with slower write performance at a later point in time. However, such storage devices often stop processing incoming data write operations while they are transferring data out of their buffers to their permanent storages. Furthermore, if a storage device's buffer fills up, the storage device may stop accepting new data write operations until data is moved out of the buffer.

In some scenarios, such as where storage devices are used for frequent data write operations, such delays can counteract any improvement to write performance provided by an internal buffer.

At least some of the embodiments of the technologies described herein solve these problems by writing data to internal buffers of some storage devices in a set of storage device, while other storage devices in the set transfer data from their internal buffers to their permanent storages. At a certain point, such as when an available buffer capacity of some of the storage device falls below a specified threshold, the storage devices performing write operations can switch to transferring buffered data to their permanent storages, while subsequent write operations are performed using other storage devices with available buffer capacity.

For example, given an amount of data to store in a group of storage devices, a host computer connected to the group of storage devices can transmit part of the data to a storage device based on a buffer size of the storage device. The host computer can then transmit other portions of the data to other storage devices based on buffer sizes of the other storage devices while the first storage device transfers the part of the data in its buffer to its permanent storage. Once the transfer is complete, the host computer can transmit an additional part of the data to the storage device based on its buffer size. Similarly, while the additional part of the data is being written to the buffer of the first storage device, other storage devices that received parts of the data can transfer the data in their buffers to their permanent storages. In this way, the better write performance of storage device buffers can be leveraged without incurring delays while data is transferred from storage device buffers to permanent storages.

Additionally, using at least some of the embodiments of the technologies described herein, storage devices can be grouped into clusters, and data write operations can be transmitted to storage devices in one cluster while storage devices in another cluster transfer data from their buffers to their permanent storages. For example, storage devices can be grouped into clusters based on attributes of the storage devices that describe storage capacity, reliability, data retention, power consumption, and/or performance characteristics of the storage devices, such as buffer sizes, buffer write speeds, and/or permanent storage write speeds. Data payloads can be matched to the various clusters based on the attributes of the storage devices in each cluster.

FIG. 1 is a system diagram of example system 100 configured to alternate scheduling of data write commands (e.g., data write command 150) to multiple storage devices 120-130 based on buffer zones 122-132 of the storage devices 120-130.

The system 100 comprises a data access scheduler 110 connected to the storage devices 120-130. In at least some embodiments, the data access scheduler 110 can comprise one or more software and/or hardware components of a host computer (not shown) connected to the multiple storage devices 120-130 by direct connections, network connections, or some combination thereof.

The data access scheduler 110 is configured to receive data write requests (e.g., data write request 140) and to schedule transmission of data write commands (e.g., 150) to the storage devices 120-130 based on a status of one or more of the buffer zones 122-132 of the storage devices 120-130. For example, the data access scheduler can be configured to receive the data write request 140 to store data in the storage devices 120-130. The data access scheduler can determine that there is space in the buffer zone 122 of the storage device 120 to store the data and transmit the data write command 150 to the storage device 120. In at least one embodiment, the data write command 150 can comprise instructions for the storage device 120 to store the data in the buffer zone 122. In a different or further embodiment, the storage device 120 can be configured to store the data received as part of the data write command 150 in the buffer zone 122 initially.

In at least one embodiment, the data access scheduler 110 identifies more than one of the storage devices 120-130 with buffer space available for storing the data and transmits the data write command 150 to the identified storage devices.

Optionally, the data access scheduler 110 can transfer a NOOP command 160 to one or more of the storage devices (e.g., 130) to which the data write command 150 is not transmitted. The NOOP command 160 can be transmitted to the one or more storage devices to indicate to those storage devices that they are not currently needed for processing data access operations. In response to receiving the NOOP command 160, the one or more storage devices can begin to transfer data from their buffer zones to their storage zones.

In at least one embodiment, the data access scheduler 110 can determine that a utilization of the buffer zone 132 is above a specified threshold and can schedule the storage device 130 to transfer data in the buffer zone 132 to a storage zone 134 of the storage device 130. For example, the data access scheduler can transmit NOOP commands (e.g., 160) to the storage device 130 until a transfer of data from the buffer zone 132 to the storage zone 134 is complete. The data access scheduler 110 can transmit data write commands (e.g., 150) to other storage devices while the data is transferred from the buffer zone 132 to the storage zone 134. In a different or further embodiment, the data access scheduler 110 can transmit a command to the storage device 130 to instruct the storage device 130 to transfer the data in the buffer zone 132 to the storage zone 134. Such a command can be, for example, a command to enter a maintenance mode or service mode.

For subsequent data write requests received by the data access scheduler 110, a different one or more of the storage devices 120-130 can be used to store the subsequent data while the one or more storage devices that stored the initial data in their buffer zones transfer the buffered data to their storage zones. For example, the data access scheduler 110 can receive another request (not shown) to store additional data in the storage devices 120-130. The data access scheduler can determine that there is not space in the buffer zone 122 of the storage device 120 and that there is space in the buffer zone 132 of the storage device 130 to store the additional data. The data access scheduler can transmit a data write command (not shown) to the storage device 130 to store the additional data in the buffer zone 132. The data access scheduler 110 can schedule the storage device 120 to transfer the data stored in the buffer zone 122 to a storage zone 124 of the storage device 120.

Optionally, the data access scheduler can comprise storage device attributes 112-114 associated with the storage devices 120-130. The data access scheduler 110 can use the storage device attributes 112-114 when determining which of the storage devices 120-130 to transmit data write commands to and/or which of the storage devices 120-130 to schedule for transferring data from their buffer zones to their storage zones. The storage device attributes 112-114 can comprise descriptions of storage capacity and/or performance characteristics of the storage devices, such as buffer sizes, buffer zone write speeds, storage zone write speeds, etc. In at least some embodiments, the attributes 112-114 can comprise buffer utilization metrics for the storage devices 120-130. The utilization metrics can indicate how much buffer capacity in the storage devices 120-130 is used to store data and/or average amounts of buffer capacity that is used to store data over time.

In a different or further embodiment, the data access scheduler 110 is configured to query the storage devices 120-130 for storage capacity and/or performance information (e.g., 170 and 180) and to generate the storage device attributes 112-114 based on the storage capacity and performance information.

Optionally, one or more of the storage devices 120-130 can comprise storage indices (e.g., 126 and 136). The storage devices 120-130 can use the storage indices 126-136 to track which data items and/or objects are stored in which storage devices. When data items or data objects are stored or removed from a storage device, the index for the storage device can be updated to reflect the addition or removal. In at least some cases, storing the storage indices 126-136 in the buffer zones 122-132, respectively, can improve the performance of index update operations. In embodiments where a buffer zone of a storage device often has better write performance (at least for random access write operations) than a storage zone of the storage device, write operations to update a storage index stored in a buffer zone can have better performance than write operations to update a storage index stored in a storage zone. Storing a storage index for a storage device in the storage device can also improve data management operations in some cases, since the index and the storage device with which the index is associated will share the same fate (i.e., if the storage device fails, the storage index will not have to be removed from a separate storage location).

In any of the examples described herein, a storage device can be any device capable of storing data in an internal buffer and transferring the data from the buffer to a permanent storage of the device, including a device capable of storing data in two separate regions or zones using different storage formats. For example, the storage device can be a magnetic storage device, such as a hard disk drive, that is capable of storing data in multiple magnetic recording formats. Other examples of storage devices include flash storage devices (such as NAND-type flash devices), and random access data storage devices (such as DRAM devices), that are configured to store data using more than one storage format.

In some embodiments, the storage device comprises multiple disparate storage media. For example, the storage device can be a hard disk drive that comprises one or more magnetic disks for use as a permanent storage and an internal memory for use as a buffer. In another example, the storage device comprises solid state storage for use as a buffer and magnetic storage for use as a permanent storage. Other combinations of disparate storage media are also possible. As used herein, the term "permanent storage" can comprise one or more non-volatile storage media. In at least some embodiments, data stored in a storage location of a permanent storage can be modified and/or deleted.

The storage device can organize storage locations into multiple zones. Different zones can be associated with different storage characteristics. For example, zones can store data using different storage formats.

Zones of a storage device can also be associated with different levels of storage reliability and/or data access performance. For instance, the storage device can be configured to store data written to one zone redundantly, such as by writing the data multiple times on separate media. A particular example of this is a storage device that comprises multiple magnetic disk platters and at least one zone that duplicates data written to the zone across the multiple magnetic disk platters.

The storage device can associate storage locations (such as physical block addresses (PBAs)) with logical block addresses (LBAs). The LBAs are used by external components to identify and access blocks of data stored in the storage device. This allows the physical storage location of the data blocks to be changed by the storage device, while the data's logical address that is used by the external components remains the same.

In any of the examples described herein, a storage format is a format for recording data on a physical storage medium. Examples of storage formats include perpendicular magnetic recording (PMR), shingled magnetic recording (SMR), heat-assisted magnetic recording (HAMR), microwave assisted magnetic recording (MAMR), bit patterned magnetic recording (BPMR), single-level cell (SLC) storage, multi-level cell (MLC) storage, and triple-level cell (TLC) storage.

Different storage formats can have different data capacities when storing data on the same storage medium. For example, data can be stored more compactly by using an SMR format than by using a PMR format. However, the different storage formats can also have different performance and/or reliability characteristics. For example, in some cases random access write operations can be performed faster when data is stored using a PMR format than if the same data were stored using an SMR format.

In any of the examples described herein, a storage device controller can comprise one or more hardware components, such as a firmware, of a storage device. Alternatively, the storage device controller can be implemented at an intermediate layer between an application and the storage device. Such an intermediate layer controller can comprise software (such as a driver) and one or more processors, and/or an application-specific integrated circuit (ASIC).

In some embodiments, the storage device controller can be part of an application. In such an embodiment, the application may use the storage device controller to access a storage device directly, without using an intermediate layer, such as a driver.

The storage device controller can be located on a computer containing the storage device, or on a separate computer that is connected to the storage device via a communications channel, such as a computer network.

In any of the examples described herein, a data block (or block of data) can be a sequence of data units, such as bytes, bits, etc., that has a fixed size (sometimes referred to as a "block size"). In a storage device that supports data blocks, data is read from and/or written to the storage device one block at a time. A data block can have a physical address that identifies a position where it is stored in the storage device and a logical address, such as a logical block address (LBA), which is used by external components to identify and access the data block. By using logical addresses, the physical locations of data blocks in the storage device can change without having to notify or update any external components.

In any of the examples described herein, a host computer can be a server or other computing device that comprises a processor and a memory, and that is connected to one or more storage devices. The host computer is configured to send data read and write operations to the storage devices and receive responses from the storage devices. The connection can be a direct connection or an indirect connection, such as a connection over a network. In scenarios where the host computer is connected to more than one storage device, the various connections can be of the same type or different types. In some embodiments, the host computer can comprise a storage controller connected to multiple storage devices.

Figure 2:
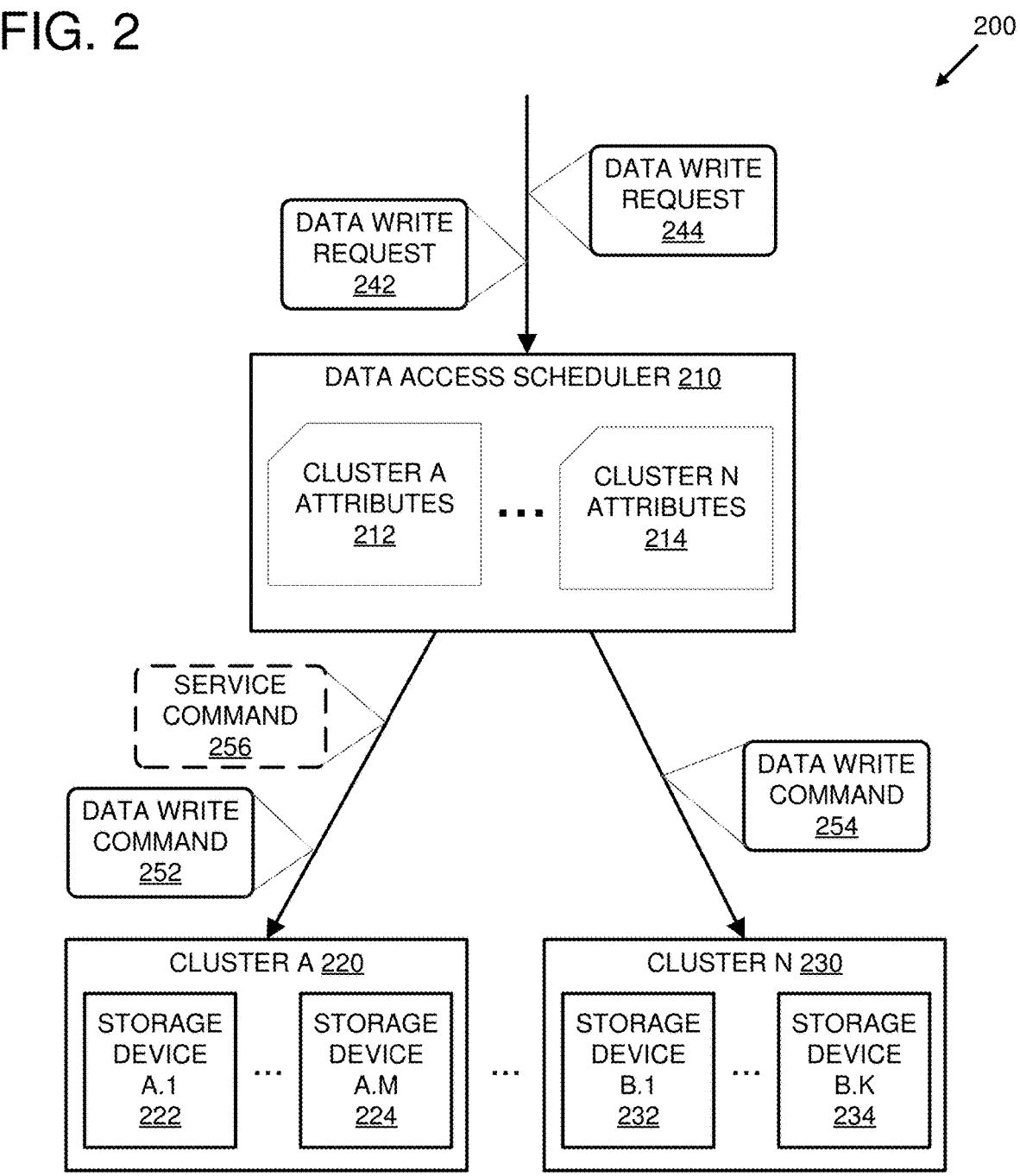
FIG. 2 is a system diagram showing an example system configured to alternate scheduling of data write commands to multiple storage device clusters based on cluster attributes.

FIG. 2 is a system diagram of an example system 200 configured to alternate scheduling of data write commands to multiple storage device clusters 220-230 based on cluster attributes 212-214. The multiple storage device clusters 220-230 comprise multiple storage devices 222-234 that are grouped based on common storage device attributes (e.g., storage device cluster attributes 212-214). The storage device attributes can be generated, for example, based on storage capacity and/or performance information for the multiple storage devices 222-234.

A data access scheduler 210 is configured to generate or receive the storage device attributes from the multiple storage devices 222-234 and to group the multiple storage devices 222-234 into the multiple storage device clusters 220-230 based on the storage device attributes. For example, the data access scheduler 210 can determine, based on the storage device attributes, that the storage devices 222-224 have the same or similar storage capacity and/or performance and group the storage devices 222-224 into the cluster 220. In a particular embodiment, the data access scheduler 210 can determine that the storage devices 222-224 have internal buffers with the same or similar characteristics (such as internal buffer capacity, internal buffer write speed, etc.) and can group the storage devices 222-224 based on these same or similar internal buffer characteristics. Similarly, the data access scheduler 210 can group the storage devices 232-234 into the cluster 230 based on same or similar storage capacity and/or performance characteristics of the storage devices 232-234. The clusters 220-230 can comprise different numbers of storage devices. In at least one embodiment, a cluster can comprise a single storage device. Although two clusters are illustrated, other numbers of clusters are also possible.

The data access scheduler 210 is configured to store storage device cluster attributes 212-214 that describe the storage capacity and/or performance characteristics common to storage devices in the storage device clusters 22-230. For example, the cluster attributes 212 describe the storage capacity and/or performance characteristics common to the storage devices 222-224 in the cluster 220 and the cluster attributes 214 describe the storage capacity and/or performance characteristics common to the storage devices 232-234 in the cluster 230.

The data access scheduler is configured to receive data write requests (e.g., 242 and 244) and to alternate the scheduling of data write operations between the multiple storage device clusters 220-230.

For example, the data access scheduler can receive the data write request 242, match parameters of the data write request 242 to the cluster attributes 212 associated with the cluster 220 and transmit a data write command 252 to one or more of the storage devices 222-224 in the cluster 220. In at least one embodiment, matching the parameters of the data write request 242 to the cluster attributes 212 comprises identifying an available buffer capacity in the cluster attributes 212 and determining that the available buffer capacity is greater than or equal to a size of a data payload in the data write request 242. In a different or further embodiment, matching the parameters of the data write request 242 to the cluster attributes 212 comprises identifying a data buffer write performance in the cluster attributes 212 and determining that the data buffer write performance meets a data write performance requirement associated with the data write request 242. In a different or further embodiment, the data access scheduler 210 can decrease the available buffer capacity stored in the cluster attributes 212 by the size of the data payload in the data write request 242 after the data write command is transmitted to the one or more of the storage devices 222-224 in the cluster 220.

The data access scheduler 210 can receive a subsequent data write request 244. In some scenarios, the data access scheduler 210 can determine that the cluster attributes 212 do not match one or more parameters of the data write request 244. For example, the data access scheduler 210 can use an available buffer capacity of the cluster attributes 212 to determine that, after processing the data write command 252, there is insufficient buffer capacity available in cluster 220 to store a data payload of the data write request 244. In a different or further embodiment, the data access scheduler 210 can identify the data buffer write performance in the cluster attributes 212 and determine that the data buffer write performance does not meet a data write performance requirement associated with the data write request 244.

The data access scheduler 210 can analyze other attributes of the cluster attributes 212-214 to identify attributes or other clusters that match the one or more parameters of the data write request 244. For example, the data access scheduler 210 can determine that cluster attributes 214 for cluster 230 match the one or more parameters and can transmit a data write command 254 comprising the additional data to one or more of the storage devices 232-234 in the cluster 230.

The one or more of the storage devices 222-224 that received the data write command 252 are configured to transfer the data written to their internal buffers to their permanent storages. In some embodiments, the storage devices 222-224 are configured to transfer data from the internal buffers to the permanent storages when the storage devices are not servicing data access requests (such as data write commands and/or data read commands). The data access scheduler 210 can transmit the data write command 254 to the one or more of the storage devices 232-234 in the cluster 230, at least in part, to give the storage devices 222-224 in the cluster 220 an opportunity to transfer the data written to the internal buffers of the one or more of the storage devices 222-224 by the data write command 252 to their permanent storages.

In a different or further embodiment, one or more of the storage devices 222-224 in the cluster 220 can be configured to enter a maintenance or service mode in which data is transferred from their internal buffers to their permanent storages. In such an embodiment, the data access scheduler can be configured to transmit a service command 256 to the one or more of the storage devices 222-224 in the cluster 220 to request that the one or more of the storage devices 222-224 enter such a maintenance or service mode.

As data is transferred from the internal buffers of the storage devices 222-224 to their permanent storages, the data access scheduler 210 can update the available buffer capacity in the cluster attributes 212 to reflect the increase in available buffer space in the one or more of the storage devices 222-224. In at least one embodiment, the data access scheduler can track the transfer of data from the internal buffers to the permanent storages by receiving status messages from the one or more of the storage devices 222-224. For example, the data access scheduler 210 can periodically query the storage devices 222-224 to request status information pertaining to ongoing service and/or maintenance on the storage devices, including transfer of data from buffers to permanent storages. Alternatively or additionally, the data access scheduler 210 can receive a notification from a storage device of the storage devices 222-224 when an available buffer capacity of the storage device is above a specified threshold.

In a different or further embodiment, the data access scheduler 210 can estimate an amount of time that it will take for a storage device of the storage devices 222-224 to transfer data from its internal buffer to its permanent storage. For example, given an amount of data currently stored in the storage device's buffer and a rate of data transfer for moving data from the storage devices internal buffer to its permanent storage, the data access scheduler 210 can estimate an amount of time that take, after the storage device begins transferring data, for the data transfer to complete.

In some embodiments, the data access scheduler 210 can deprioritize the storage devices 222-224 in the cluster 220 for data read commands while the storage devices 222-224 are transferring data from their internal buffers to their permanent storages. For example, in embodiments where data is stored redundantly in storage devices in more than one of the clusters 220-230, the data access scheduler 210 can prioritize using storage devices in other clusters for data read access over the storage devices 222-224. In some cases, data read commands can interrupt or slow the transfer of data from a storage devices buffer to its permanent storage. In such cases, deprioritizing the storage devices transferring data for data read commands can reduce the amount of time it takes to transfer data to a permanent storage, and to make the amount of time it takes for the various storage devices transferring data to their permanent storages more consistent. Making the data transfer times of the various storage devices more consistent can be advantageous in embodiments where the data access scheduler 210 estimates transfer times for the storage devices.

Once the data access scheduler 210 determines that the transfer of data from the internal buffers of the one or more of the storage devices 222-224 is compete, and/or that the available buffer capacity in the cluster attributes 212 is above a specified threshold (for example, by using one or more of the techniques described above), the data access scheduler 210 can switch back to transmitting data write commands to storage devices 222-224 in the cluster 220 instead of the storage devices 232-234 in the cluster 230, during which the storage devices 232-234 can transfer the additional data stored in their internal buffers to their permanent storages.

In at least some embodiments, the data access scheduler 210 can be a host computer connected to the multiple storage devices 222-234. In an alternative embodiment, the multiple storage devices 222-234 can be connected to multiple host computers and the data access scheduler 210 can be a service on a separate server computer configured to communicate with the storage devices 222-234 via the multiple host computers and a communication network.

Figure 3:
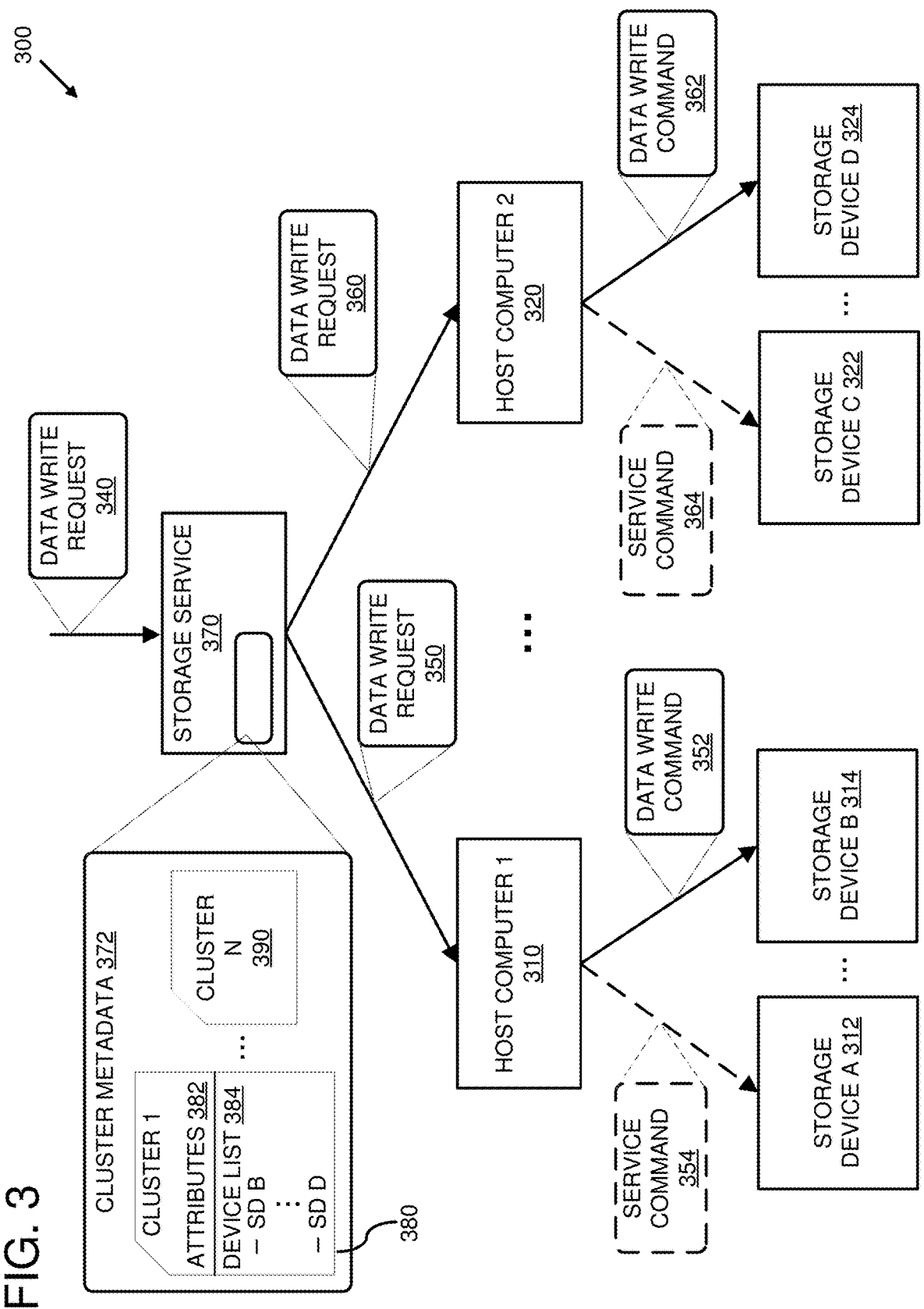
FIG. 3 is a system diagram showing an example system comprising a storage service configured to alternate writing data to multiple clusters of storage devices connected to multiple host computers.

FIG. 3 is a system diagram showing an example system 300 comprising a storage service 370 configured to multiple clusters of storage devices 312-324 connected to multiple host computers 310-320.

The storage service 370 is configured to communicate with the multiple host computers 310-320. For example, the storage service 370 can be a service running on a separate server computer configured to communicate with the host computers 310-320.

The storage service 370 is configured to logically group the storage devices 312-324 into multiple storage device clusters 1-N and to store metadata 372 for the storage device clusters (e.g., cluster 1 metadata 380, . . . , cluster N metadata 390). The cluster metadata for a storage device cluster can comprise a list of the storage devices in the cluster and attributes describing various storage capacity and/or performance characteristics common to the storage devices in the cluster. For example, the cluster 1 metadata 380 comprises attributes 382 and a device list 384, which includes identifiers for the storage device 314 and the storage device 324. In at least one embodiment, the cluster 1 attributes 382 indicate whether the storage cluster 1 is available for servicing data write requests and/or an available buffer capacity for the storage devices in the cluster.

The storage service 370 can be configured to obtain storage capacity and/or performance information for the storage devices 312-324 and to group storage devices with the same or similar capacity and/or performance characteristics into clusters. The storage capacity and/or performance information can be obtained, for example, by transmitting requests for the information to the host computers 310-320, which in turn can query the storage devices for the information and transmit it back to the storage service 370. The storage service 370 can generate the cluster metadata 372 based on the groupings and the identified same or similar capacity and/or performance characteristics.

In a different or further embodiment, the cluster metadata 372 can be generated by one or more separate processes that perform the clustering of the storage devices 312-324 into the storage device clusters 1-N. The cluster metadata 372 can then be transmitted by the one or more separate processes to the storage service 370.

The storage service 370 is configured to receive a data write request 340 and to identify a storage device cluster to service the data write request 340. The storage service 370 is configured to identify a storage device cluster using the cluster metadata 372. The storage service 370 can identify a storage device cluster to service the data write request 340 by comparing one or more attributes of the data write request 340 to one or more of the storage cluster attributes in the cluster metadata 372. For example, the storage service 370 can examine the attributes 382 for cluster 1 to determine that the cluster is available for servicing data write requests and/or that an available buffer capacity of the storage devices in the cluster 1 is greater than or equal to a size of data to be written by the data write request 340.

If the attributes 382 for cluster 1 match the one or more attributes of the data write request 340, then the storage service transmits data write requests to the host computers connected to the storage devices identified in the device list 384. For example, the device list 384 indicates that the cluster 1 comprises the storage devices 314 and 324. The storage service 370 transmits a data write request 350 to the host computer 310 to write data to the storage device 314. The storage service 370 also transmits a data write request 360 to the host computer 320 to write data to the storage device 324. If additional storage devices are listed in the device list 384, the storage service 370 can transmit additional data write requests to the host computers connected to those storage devices as well. In some cases, more than one storage device in a cluster can be connected to a same host computer. In such cases, the storage service 370 can transmit requests to write data to the more than one storage device in one or more messages to the host computer.

The host computer 310 is configured to receive the data write request 350 from the storage service 370 and to transmit a data write command 352 to the storage device 314 to store the data received as part of the data write request 350 in an internal buffer of the storage device 314. Similarly, the host computer 320 is configured to transmit a data write command 362 to the storage device 314 to store the data received as part of the data write request 360 in an internal buffer of the storage device 324.

Various data storage techniques can be employed by the storage service 370 for storing the received data in the storage devices of the identified cluster. In one embodiment, the storage service 370 breaks data received as part of the data write request 340 into multiple parts and transmits the multiple parts to different storage devices in the identified cluster. In a different or further embodiment, the storage service 370 transmits duplicate copies of the data received as part of the data write request 340 to the storage devices in the identified cluster. In a different or further embodiment, the storage service 370 generates data shards based on the data received as part of the data write request 340 and transmits the data shards to different storage devices in the identified cluster. In at least one embodiment, the storage service 370 is configured to transmit parts or shards of the received data to the storage devices in the identified cluster in such a way as to ensure that copies of each part or shard is transmitted to storage devices connected to more than one different host computer. Such a configuration can enhance data recovery in the event of a failure of a host computer.

The storage service 370 is configured to identify storage device clusters that are in need of maintenance operations, such as moving data from internal buffers to permanent storages, and to omit the identified clusters from servicing data write requests. For example, the cluster attributes (e.g., 382) for the various clusters can comprise status flags that indicate whether or not the cluster is available for servicing data write requests. When the storage service 370 determines that the storage devices in a cluster are in need of maintenance, it can change a value of a status flag in the attributes for the cluster to indicate that the cluster should not be used to service subsequent data write requests.

In at least one embodiment, the storage service 370 determines that the storage devices in a cluster are in need of maintenance by determining that an available buffer capacity for the storage devices is below a specified threshold. For example, the storage service 370 can query the host computers connected to the storage devices in the cluster to obtain information related to available buffer capacities for the storage devices. As storage devices in the cluster receive data write commands and store received data in their internal buffers, the available capacities of their internal buffers will decrease. When the available buffer capacities fall below the specified threshold, the storage service can update the status flag for the cluster in order to prevent further data write requests from being serviced by the storage devices.

In a different or further embodiment, the storage devices 312-324 can be configured to transmit status information to the storage service 370 via the host computers 310-320 that indicates whether the storage devices 312-324 are in need of maintenance (such as when an available capacity of an internal buffer has fallen below a specified threshold). When a certain percentage of the storage devices in a cluster have indicated that they are in need of maintenance, the storage service 370 can update the status flag value for the cluster to prevent further data write requests from being service by the storage devices in the cluster.

Optionally, the storage service 370 can transmit requests to host computers connected to storage devices in a cluster in need of maintenance to have the storage devices in the cluster placed in a maintenance or service mode. The host computers can then transmit maintenance or service commands (e.g. 354 and 364) to the connected storage devices in the cluster.

The storage service 370 is configured to monitor the maintenance operations performed on the storage devices in a cluster that is not available for servicing data write requests to determine when maintenance is complete. In one embodiment, the storage service 370 can transmit requests to the host computers connected to the storage devices in the cluster, requesting available buffer capacity information for the storage devices. In a different or further embodiment, the host computers connected to the storage devices in the cluster can monitor the maintenance progress of the storage devices and transmit status updates to the storage service 370.

When the storage service 370 determines that maintenance for a cluster is complete (e.g., by determining that available buffer capacity for the cluster is above the specified threshold), the storage service 370 can update the status flag value for the cluster to indicate that the cluster can be used to service data write requests again.

As maintenance, such as moving data from internal buffers to permanent storages, is performed by storage devices in some clusters, other clusters of storage devices can be used to service received data write requests. Eventually, the storage devices in the clusters servicing the data write requests will be in need of maintenance. Storage devices in the various clusters 1-N can be provisioned in such a way that storage device clusters performing maintenance will be completing maintenance operations as clusters servicing data write operations will start to be in need of maintenance. Once the storage device clusters have been created, in at least some embodiments, new storage devices matching existing cluster attributes can be provisioned in order to adjust the numbers of storage devices in the various clusters that are available for servicing data write requests at any given time. As cluster sizes are adjusted to match data workload volumes, the number of storage devices available for servicing data write requests will begin to balance with the number of storage devices performing maintenance, so that an amount of buffer capacity necessary to service the data workload volumes will be continuously available.

Figure 4:
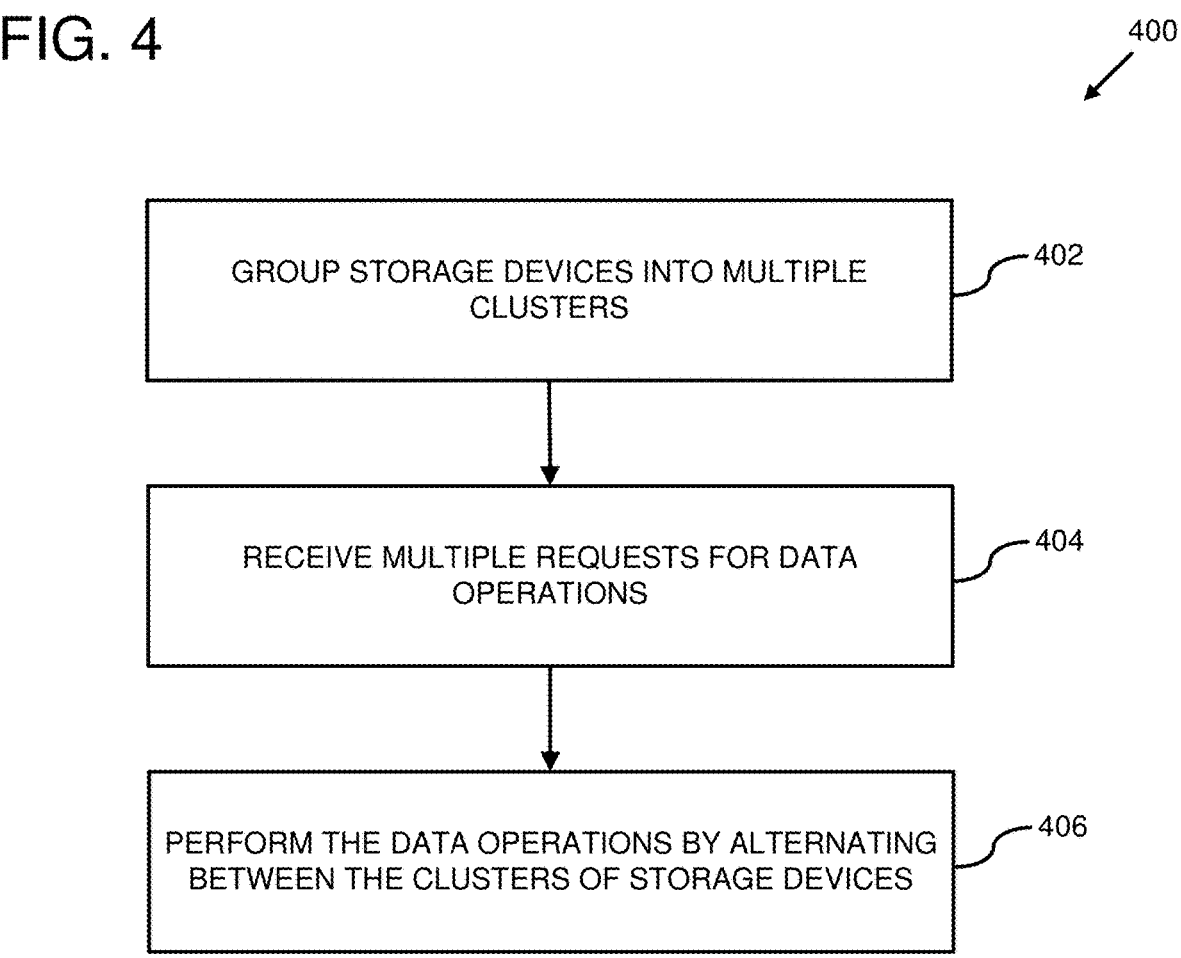
FIG. 4 is a flowchart of an example method of performing data write operations by alternating between multiple clusters of storage devices.

FIG. 4 is a flowchart of an example method 400 of performing data write operations by alternating between multiple clusters of storage devices. Any of the example systems described herein can be used for performing the example method 400.

At 402, storage devices are grouped into multiple clusters. The clustering can comprise identifying attributes of the storage devices and grouping storage devices with same or similar attributes together.

In at least one embodiment, the attributes comprise buffer sizes of the storage devices. In such an embodiment, storage devices with the same or similar buffer sizes are clustered together. In a different or further embodiment, the attributes comprise buffer write speeds. In such an embodiment, storage devices with same or similar buffer write speeds can be clustered together. In an embodiment where the attributes comprise buffer sizes and buffer write speeds, the grouping can comprise determining buffer transfer times for the storage devices by multiplying the buffer sizes of the storage devices by the buffer write speeds of the storage devices and grouping storage devices with same or similar buffer transfer times together. In a different or further embodiment, the attributes can comprise storage media write speeds for the storage devices. In such an embodiment, storage devices with same or similar storage media write speeds can be grouped together. In an embodiment where the attributes comprise buffer sizes and storage media write speeds, hold times (times that it will take for storage devices to transfer all the data in their buffers to their storage media) can be determined by multiplying the buffer sizes of their storage devices by their storage media write speeds. In such an embodiment, storage devices with same or similar hold times can be grouped together.

At 404, multiple requests for data operations (such as data write operations, data read operations, etc.) are received. In at least one embodiment, the requests for data operations are received by a host computer connected to the storage devices. In a different or further embodiment, the data requests are received by a storage service separate from one or more host computers connected to the storage devices. The data operation requests can comprise data to be written to one or more of the storage devices.

At 406, the requested data operations are performed by alternating between the clusters of storage devices, such that one of the data operations targets an internal buffer of storage devices in one of the clusters while storage devices in another of the clusters transfers data from their internal buffers to permanent storages. In at least one embodiment, the internal buffer of a storage device comprises a cache region of the storage media of the storage device and the permanent storage of the storage device comprises a storage region of the storage media. In a further embodiment, where the data operation requests comprise data write operations, writing data to the internal buffers of the storage devices in the one of the clusters comprises writing data to the cache regions of the storage devices using a first storage format (such as a PMR format) and transferring data to the permanent storages of the storage devices in the another of the clusters comprises writing the data to the storage regions of the storage devices using a second storage format (such as an SMR format).

In at least one embodiment, the data operations can be scheduled to run on clusters with attributes that match characteristics of the data operations. For example, a size of data contained in a data write operation request can be used to match the data to a cluster of storage devices with buffer sizes that can accommodate the data. In some cases, a data write operation can be matched to more than one cluster. In such a case, the data write operation can be transmitted to storage devices in the more than one matched clusters. While the data write operation is being processed using the storage devices in the matched one or more clusters, storage devices in other clusters can transfer data currently stored in their buffers to their permanent storages. After processing of the data write operation has completed, a subsequent data write operation can be matched to one or more other clusters, such as the clusters that transferred data from their buffers to their permanent storages. While the subsequent data write operation is processed using storage devices in the matched one or more other clusters, the storage devices in the one or more clusters that processed the previous data write operation can transfer the data written by that operation from their buffers to their internal storages.

Cluster attributes, such as buffer size, buffer transfer times, and hold times can be used to determine how long it will take to write data to buffers of storage devices in a cluster and how long it will take the storage devices in the cluster to transfer data from their buffers to their permanent storages. This timing information can be used when scheduling the data write operations to determine when various clusters of storage devices will be available to process data write operations.

Figure 5:
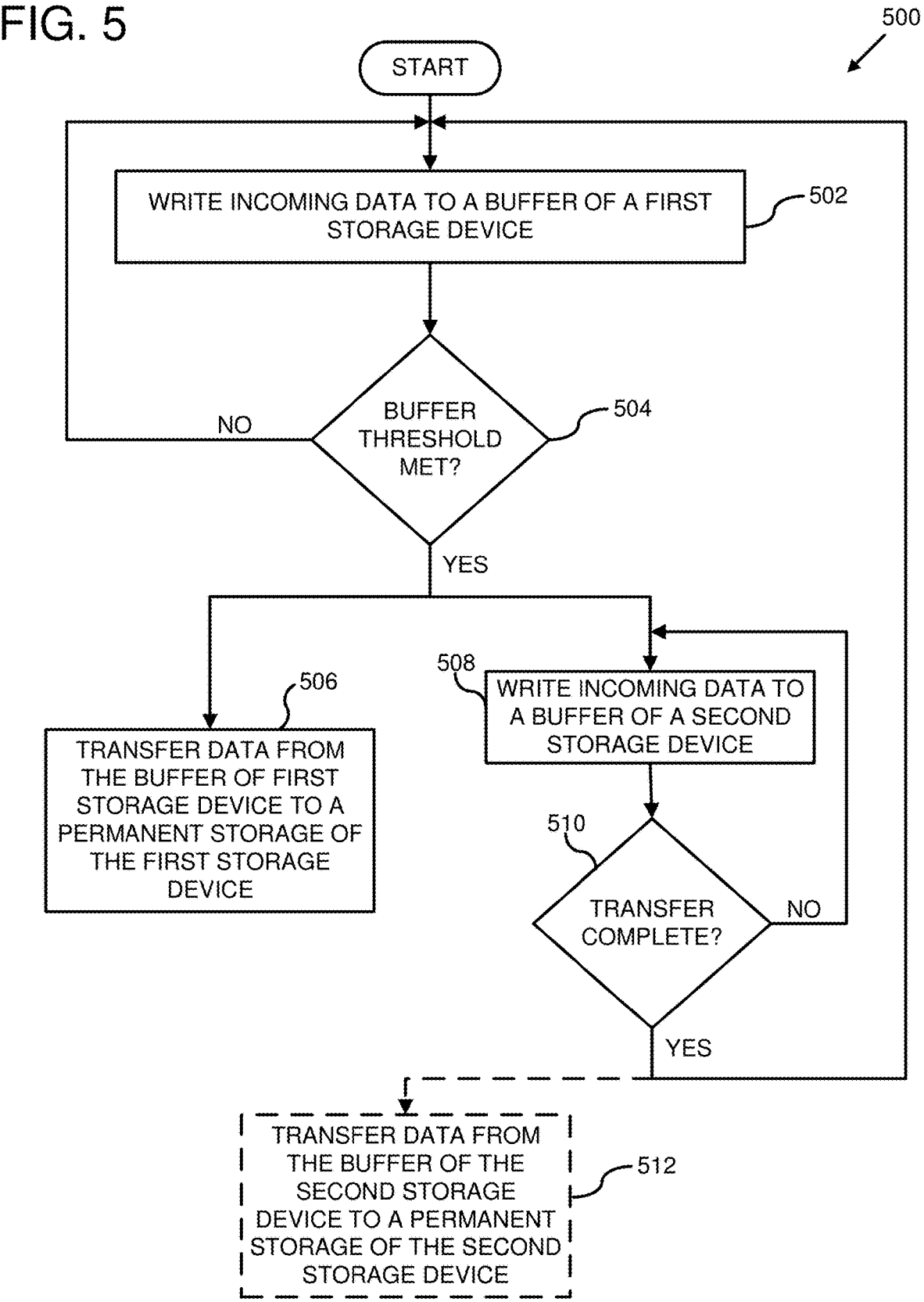
FIG. 5 is a flowchart of an example method for writing data to a buffer of one storage device while transferring data from another storage device's buffer to its permanent storage.

FIG. 5 is a flowchart of an example method 500 for writing data to a buffer of one storage device while transferring data from another storage device's buffer to its permanent storage. Any of the example systems described herein can be used for performing the example method 500.

At 502, incoming data is written to a buffer of a first storage device. The buffer of a storage device can be a cache region of a storage media of the storage device, a separate internal cache (such as an internal memory) of the storage device, or some combination thereof. At 504, it is determined whether a buffer threshold for the buffer of the first storage device has been met. Determining whether the buffer threshold has been met can comprise determining whether, after the incoming data was written to the buffer of the first storage device, whether an available buffer capacity of the first storage device is below a specified level.

The determination at 504 can be performed by a host computer connected to the first storage device by querying the first storage device for an available buffer capacity (or alternatively by tracking an amount of total data written to the buffer of the first storage device and determining a difference between a known buffer size of the first storage device and the total amount of data written to the buffer) and comparing the available buffer capacity of the first storage device to the specified threshold. In a different or further embodiment, the determination at 504 can be performed by the first storage device.

In at least one embodiment, the specified threshold can be a percentage of the first storage device's total buffer size. In a different or further embodiment, the specified threshold can be a number of data units (such as bytes, kilobytes, megabytes, etc.).

If the buffer threshold for the first storage device has not been met, then incoming data continues to be written to the first storage device. If the buffer threshold has been met, then at 508 incoming data is written to a buffer of a second storage device and at 506 data is transferred from the buffer of the first storage device to a permanent storage of the first storage device. At 510 it is determined whether the transfer at 506 is complete. If the transfer is not yet complete, then incoming data continues to be written to the buffer of the second storage device at 508. Determining whether or not the transfer is complete can comprise querying the first storage device for status information, such as a transfer progress indicator, an available buffer capacity, current buffer utilization, etc. Additionally or alternatively, the determining can comprise receiving a notification from the first storage device when the transfer is complete.

If the transfer is complete, then additional incoming data is written to the buffer of the first storage device at 502. Optionally, at 512 the data written to the second storage device's buffer is transferred to a permanent storage of the second storage device while data is written to the buffer of the first storage device at 502.

Figure 6A:
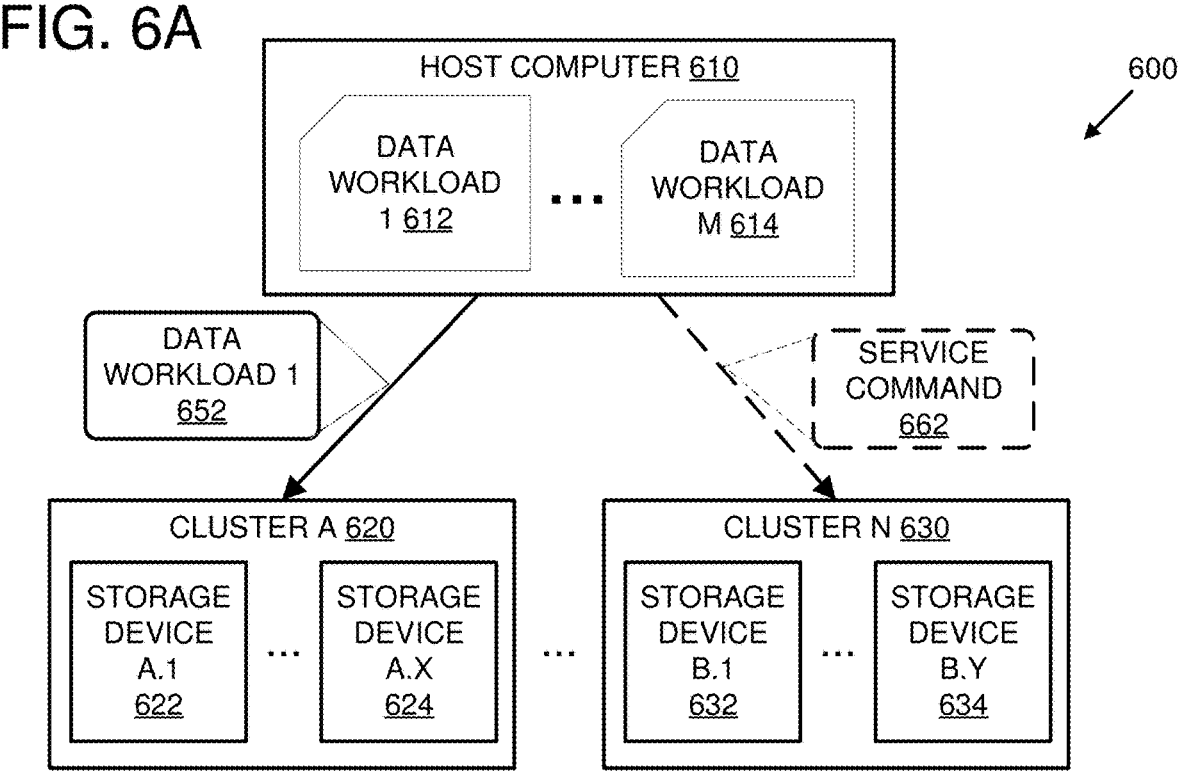
FIGS. 6A-B are system diagrams showing an example system configured to alternate transmitting data workloads to multiple clusters of storage devices.
Figure 6B:
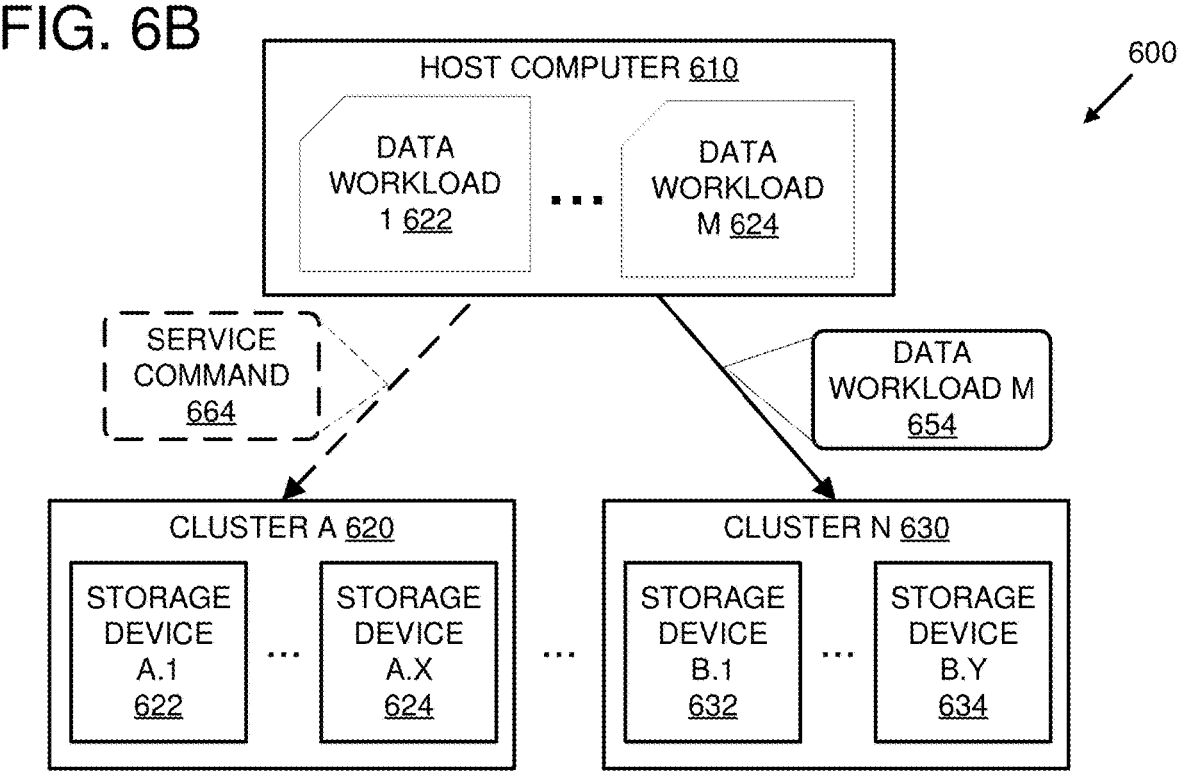

FIGS. 6A-B are system diagrams showing an example system 600 configured to alternate transmitting data workloads 612-614 to multiple storage device clusters 620-630. A host computer 610 contains the multiple workloads 612-614. A workload can comprise data to be written to one or more storage devices. In at least one embodiment, the workloads 612-614 comprise different datasets. In a different or further embodiment, the host computer 610 is configured to generate the data workloads 612-614. For example, a data file or data stream can be segmented by the host computer 610 and each of the data workloads 612-614 can contain one of the segments. In another example, the host computer can create data shards based on a data object and each of the data workloads 612-614 can comprise one or more of the data shards.

The host computer 610 is configured to transmit the data workloads 612-614 to different storage device clusters based on attributes of the storage clusters 620-630. In one embodiment, the host computer 610 matches data sizes of the data workloads 612-614 to buffer sizes of the storage devices 622-634 in the clusters 620-630. For example, the storage devices can be clustered based, at least in part, on buffer sizes of the storage devices.

In FIG. 6A, the host computer 610 is depicted as matching the data workload 612 to attributes of the storage device cluster 620 and transmitting the data workload 652 to the storage devices 622-624 in the cluster 620. Upon receipt of the data workload 652, the storage devices 622-624 in the cluster 620 are configured to store the data contained within the data workload 652 in their buffers.

As the data workload 652 is transferred to the storage devices 622-624 and processed by the storage devices 622-624, storage devices in other clusters that are not receiving data workloads (such as storage devices 632-634 in the cluster 630), can transfer data stored in their buffers to their permanent storages. Optionally, the host computer 610, can be configured to transmit a service command 662 to the storage devices in the clusters that are not currently processing data workloads in order to trigger the transfer of data from their buffers to their permanent storages.

In FIG. 6B, the host computer 610 is depicted as matching the data workload 624 to attributes of the storage device cluster 630 and transmitting the data workload 654 to the storage devices 632-634 in the cluster 630. Upon receipt of the data workload 654, the storage devices 632-634 in the cluster 630 are configured to store the data contained within the data workload 654 in their buffers.

As the data workload 654 is transferred to the storage devices 632-634 and processed by the storage devices 632-634, storage devices in other clusters that are not receiving data workloads (such as storage devices 622-624 in the cluster 620), can transfer data stored in their buffers (such as the data that was contained in the data workload 652) to their permanent storages. Optionally, the host computer 610, can be configured to transmit a service command 664 to the storage devices in the clusters that are not currently processing data workloads in order to trigger the transfer of data from their buffers to their permanent storages.

Figure 7:
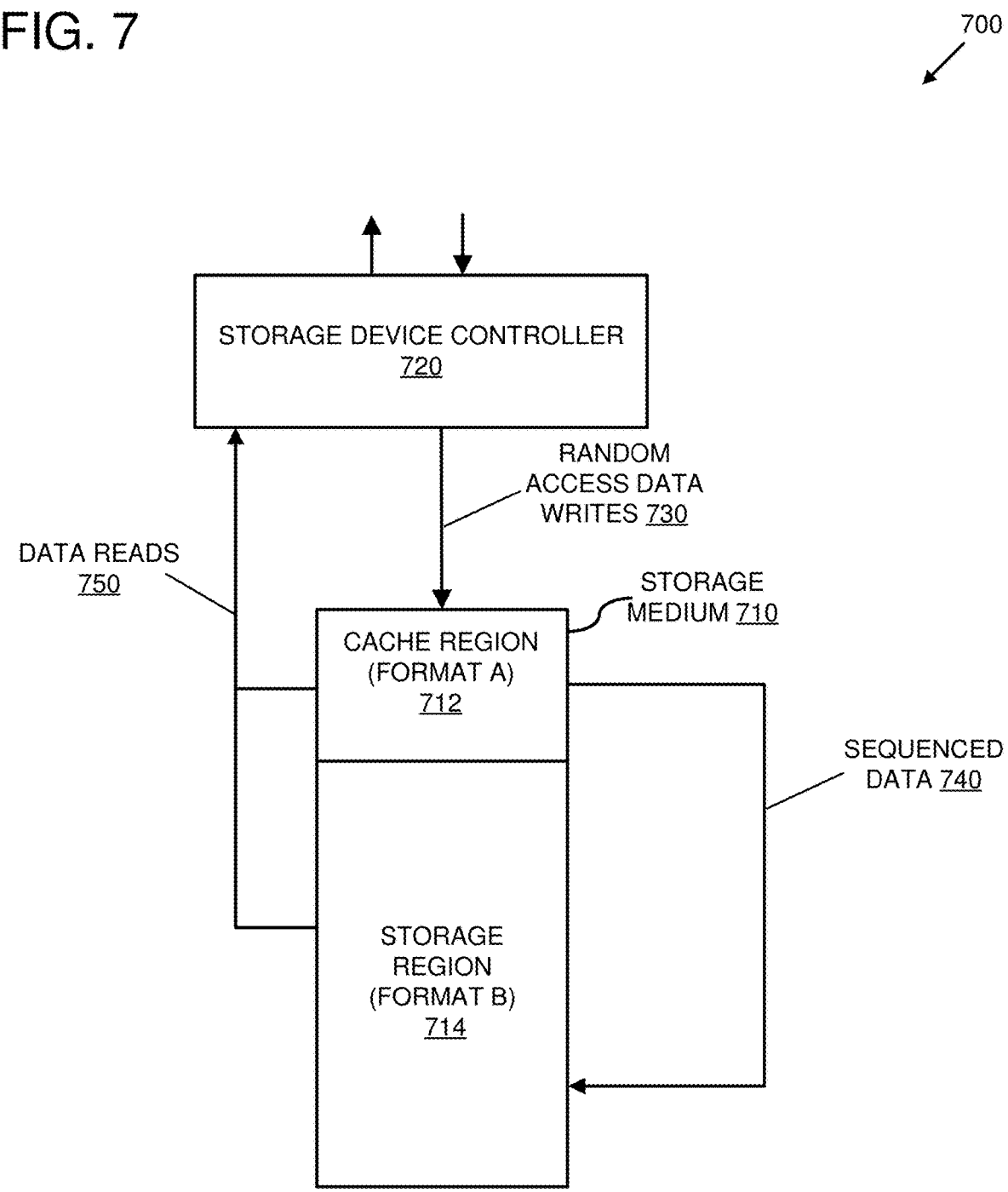
FIG. 7 is a system diagram showing an example storage device configured to store random data writes to a cache region and move sequenced data from the cache region to a storage region.

FIG. 7 is a system diagram showing an example storage device 700 configured to store random access data writes 730 to a cache region 712 of a storage medium 710, to sequence the stored random access writes 730, and to move the sequenced data 740 from the cache region 712 to a storage region 714 of the storage medium 714. The example storage device 700 can be used as a storage device in any of the example systems described herein.

The storage device 700 comprises a storage device controller 720 configured to receive data access operation requests to read and/or write data and to perform the requested operations by writing data to the storage medium 710 and reading data from the storage medium 710.

The data access operations comprise random access data writes 730. The storage device controller 720 is configured to store data blocks accompanying the random access data requests 730 in the cache region 712 of the storage medium 710 in a storage format A. In at least some embodiments, the data access operations further comprise sequential access data writes (not shown). In such embodiments, the storage device controller 720 can be configured to bypass the cache region 712 and write the sequentially addressed data blocks directly to the storage region 714 of the storage medium 710.

The storage device controller 720 is configured to store data in the storage region 714 using a different storage format B. In at least some embodiments, the storage format A can be a PMR format and the storage format B can be an SMR storage format. In some cases, performance of random access data writes is better when using a PMR format than when using an SMR format. However, data can often be stored more densely using an SMR format than a PMR format.

The storage device controller 720 is configured to identify sequences of data blocks stored in the cache region 712 and to write the identified sequences of data blocks to the storage region 714 as sequenced data 740. The sequencing can comprise tracking LBAs for various data blocks that are stored by the random access data writes 730 in the cache region 712, detecting that some of the data blocks stored in the cache region 712 have sequentially numbered LBAs, and copying the data blocks associated with the sequentially numbered LBAs to a sequential series of physical block addresses (PBAs) in the storage region 714.

In a different or further embodiment, the sequencing can comprise tracking PBAs that store data blocks invalidated by data blocks written to the cache region 712 as part of the random access data writes 730, determining that a sufficient number of PBAs in a given sector or track of the storage region 714 are invalidated by data blocks stored in the cache region 712, and performing a sequential copy and write operation to overwrite the sector or track with valid data, including the data blocks stored in the cache region 712.

The storage device controller 720 is further configured to perform data reads 750 by reading data from the cache region 712 and/or the storage region 714. When a read data access operation request is received by the storage device controller 720, the storage device controller can check to see if the requested data is stored in the cache region 712. If so, then the storage device controller can read the requested data from the cache region 712 and return it. If the requested data is not stored in the cache region 712, then the storage device controller 720 can read the data from the storage region 714 and return it. In at least one embodiment, the read data access operation request can comprise one or more LBAs for requested data blocks. In such an embodiment, the storage device controller 720 can check to see if data blocks associated with the requested LBAs are stored in the cache region 712. If they are, then the data blocks associated with the LBAs are read from the cache region 712 and returned by the storage device controller 720. If data blocks associated with the requested LBAs are not stored in the cache region 712, then the storage device controller reads data blocks associated with the LBAs from the storage region 714 and returns them.

Figure 8:
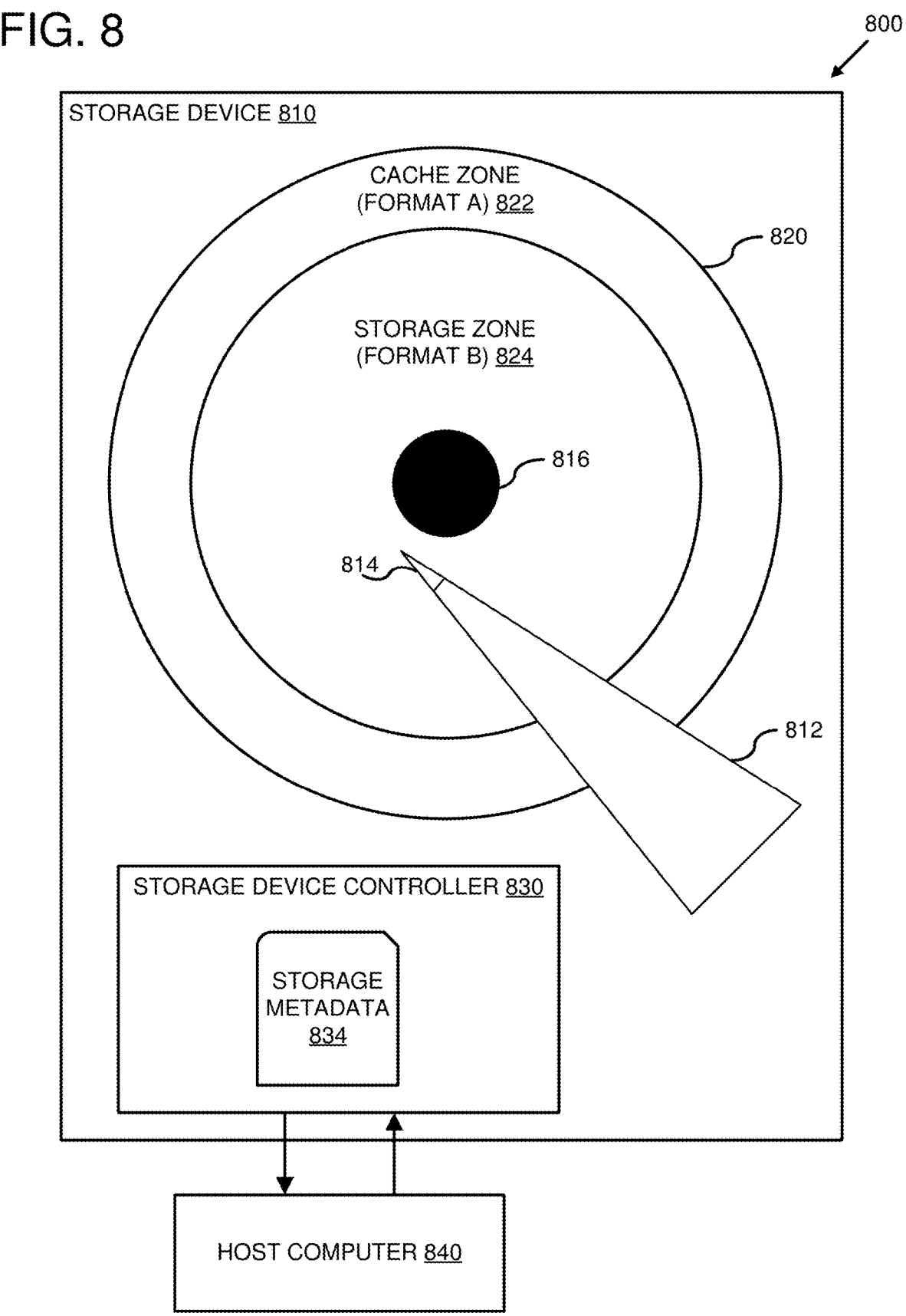
FIG. 8 is a system diagram showing an example system configured to buffer data to a cache zone of a magnetic disk of a storage device and transfer the buffered data to a storage zone of the magnetic disk.

FIG. 8 is a system diagram showing an example system 800 configured to buffer data to a cache zone 822 of a magnetic disk 820 of a storage device 810 and transfer the buffered data to a storage zone 824 of the magnetic disk 820.

The storage device 810 can be used as a storage device in any of the examples described herein. The storage device 810 comprises a magnetic disk 820 that can be rotated on a spindle 816. The storage device 810 also comprises a moveable actuator arm 812 with a read/write head 814. The actuator arm 812 can be rotated on an actuator axis (not shown) by an actuator (not shown) to move the read/write head 814 over different portions of the magnetic disk 820. The storage device 810 is configured to write data to and to read data from the magnetic disk 820 using the read/write head 814. The read/write head 814 can comprise a single head that can perform both read and write operations. Alternatively, the read/write head 814 can comprise two separate heads for reading and writing, respectively. The storage device 810 can be configured to use the read/write head 814 to write data to the magnetic disk 820 in multiple concentric circular tracks as the magnetic disk is rotated on the spindle 816.

A storage device controller 830 can send write and read access commands to the storage device 810 to write data to and read data from the storage device 810. The storage device controller 830 can specify a location on the magnetic disk 820 at which the data is to be written or from which the data is to be read. For example, each unit of data stored on the magnetic disk 820 can have a unique address, such as an LBA, that identifies the location on the magnetic disk 820 where it is stored.

The read/write head 814 can be configured to write data to the magnetic disk 820 using two different storage formats. The storage device controller 830 can specify which storage format is to be used when reading or writing the data. The storage device controller 830 can do this, for example, by switching a storage format mode of the read/write head 814.

The storage device controller 830 can designate separate zones on the magnetic disk 820, on which data can be stored using the two separate storage formats supported by the read/write head 814. In FIG. 8, for example, a cache zone 822 is designated by the storage device controller 830 comprising one or more of the outermost circular tracks of the magnetic disk 820. Data is stored in the cache zone 822 using a first storage format (format A). A storage zone 824 is designated by the storage device controller 830 comprising the remaining inner circular tracks of the magnetic disk 820. Data is stored in the storage zone 824 using a second storage format (format B).

The determination of which storage format to use for which zone can be based on a desired storage capacity and/or a desired data access performance for each zone. For example, a storage format with relatively high data access performance but relatively low storage density may be selected for the cache zone 822. A storage format with relatively high storage density but relatively low data access performance may be selected for the storage zone 824.

In some circumstances, designating the outermost portion of the magnetic disk 820 as the cache zone 822 can be preferable since, as the magnetic disk 820 rotates, data can be read at a faster rate from the outermost tracks of the magnetic disk 820 than from the inner tracks of the magnetic disk 820. Other locations on the magnetic disk 820 for the cache zone 822 and the storage zone 824 are also possible.

The storage device controller 830 is configured to receive requests to write data to and read data from the storage device 810. The storage device controller 830 can buffer received data by writing the received data to the cache zone 822 first and then moving the buffered data from the cache zone 822 to the storage zone 824 at a later point in time.

The storage device controller can keep track of which zone is storing which particular units of data using storage metadata 834. For example, in embodiments where units of data are identified using LBA's, the storage device controller 830 can keep track of whether a given LBA is currently stored in the cache zone 822 or the storage zone 824. When the storage device controller 830 receives a read request for data stored at a particular LBA, the storage device controller 830 can determine the current location of the particular LBA, in either the cache zone 822 or the storage zone 824, and then issue a read access command for the requested data. As part of, or prior to, the read access command, the storage device controller can specify the appropriate storage format based on the zone determination. For example, if the particular LBA is located in the cache zone 822, then the storage device controller 830 can specify a storage format associated with the cache zone 822 (e.g., format A). Similarly, if the particular LBA is located in the storage zone 824, then the storage device controller can specify a storage format associated with the storage zone 824 (e.g., format B).

In some embodiments, the storage device controller 830 must specify a storage format when writing data to the magnetic disk 820, but not when reading data from the magnetic disk 820. For example, read/write head 814 may use different modes for writing data in the different storage formats, but it may be able to read data stored in either format using a single read mode.

In scenarios where the storage device controller 830 buffers received data to the cache zone 822, the storage device controller 830 can use the storage metadata 834 to determine whether an LBA for the received data is already stored in the cache zone 822. If the LBA for the received data is already present in the cache zone 822, then the received data can be written to the location in the cache zone 822 where the LBA is already stored. Otherwise, the received data can be written to an available location in the cache zone 822 and the storage metadata 834 can be updated to indicate that the received data is now stored in the cache zone 822.

Occasionally, data currently stored in the cache zone 822 can be flushed to the storage zone 824. This may occur periodically, such when a recurring period of time elapses. The flushing may occur as a result of some triggering condition. For instance, data may be flushed from the cache zone 822 when no read and/or write requests for data stored in the cache zone 822 are pending. In some cases, the cache zone 822 is flushed when the cache zone 822 has reached its full capacity, i.e., the cache zone 822 cannot store any more data. In some embodiments, the storage device controller 830 can be configured to flush data from the cache zone 822 to the storage zone 824 in response to receiving a service command.

The sizes of the zones, the specified threshold or thresholds, the amount of data written to the cache zone 822, and/or the specified increment size can be stored in the storage metadata 834.

The storage device controller 830 is configured to receive data access requests and to transmit data access request responses to a host computer 840. The host computer 840 can be a host computer in any of the examples described herein. The host computer 840 can comprise a data access scheduler and/or be configured to receive data write requests from a storage service as described in the examples presented herein.

In an embodiment where the storage device controller 830 is configured to flush data stored in the cache zone 822 to the storage zone 824 in response to receipt of a service command, the host computer 840 can be configured to transmit such a service command to the storage device controller 830. The host computer 840 can be configured to transmit such a service command, for example, when the host computer 840 is not using the storage device 810 to store data.

Figure 9:
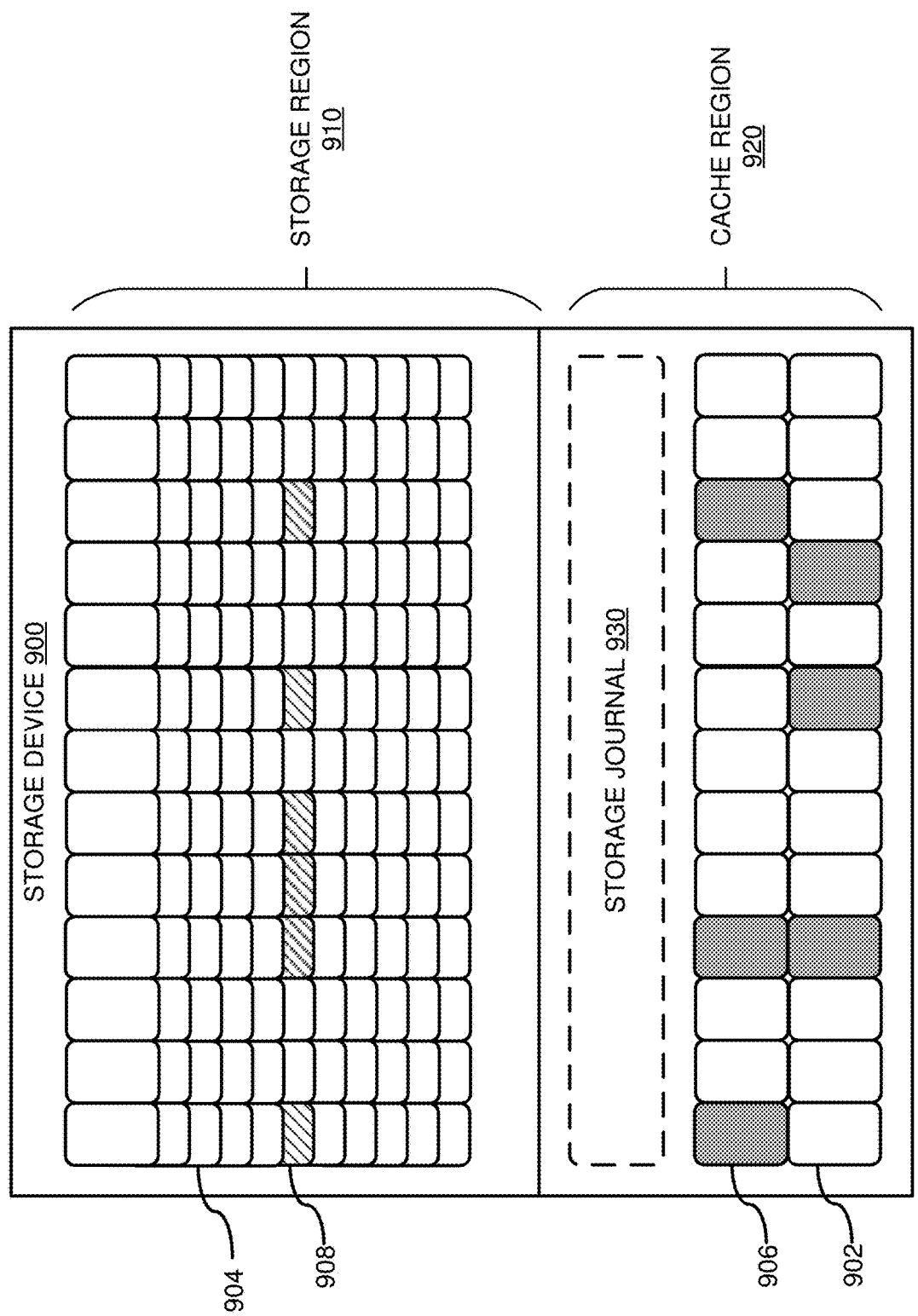
FIG. 9 is a system diagram showing an example storage device 900 configured to store data blocks for random writes to a cache region of a storage device.

FIG. 9 is a system diagram showing an example storage device 900 configured to store data blocks for random access writes (e.g., 906) to a cache region 920 of the storage device 900. The storage device 900 comprises a storage region 910 and a cache region 920. Units of data (e.g., 902-908) are stored in both the cache region 920 and the storage region 910. The units of data can be bits, bytes, data blocks, etc. Units of data are stored in the cache region 920 using a PMR storage format. Units of data are stored in the storage region 910 using an SMR storage format.

Units of data can be written to cache region 920 first and subsequently moved to storage region 910. In some cases, data units can be written the cache region 920 faster than they can be written to storage region 910. For example, a random access write operation to a data unit 902 in the cache region 920 can be performed without having to modify any of the other data units stored in the cache region 920. Contrastingly, due to the overlapping nature of data units stored using SMR, the data unit 904 in the storage region 910 cannot be modified via a random access write without also re-writing other data units. In some cases, more data units can be stored in the storage region 910 than can be stored in the cache region 920, since SMR allows data units to be stored more densely than PMR.

The storage device 900 is configured to track data units in the storage region 910 that have been invalidated by data units written to the cache region 920. A data unit in the storage region 910 can be invalidated when an overwriting data unit is written to the cache region 920 that is associated with an LBA that was associated with the data unit in the storage region 910. While the new data unit remains in the cache region, data access requests for the LBA are processed using the data unit in the cache region 910. However, the storage device 900 can continue to track the association between the data unit in the storage region 910 and the LBA so that is can determine where to write the cached data unit when it is moved to the storage region 910.

In FIG. 9, invalidated data units in the storage region 910 are depicted as black-and-white striped data units (e.g., 908) and overwriting data units in the cache region 920 are depicted as solid black data units (e.g., 906). As an example, the cached data unit 906 can be associated with an LBA that was previously associated with data unit 908. When a data access request is received that references the LBA, it will be processed using the data unit 906 in the cache region 920 instead of the data unit 908 in the storage region 910.

Optionally, the cache region 920 can comprise a storage journal 930. The storage journal 930 can be used to record storage locations for data items stored in the cache region 920 and the storage region 910 of the storage device 900. For example, the storage journal 930 can be used to track associations between identifiers for various data items or data objects and PBAs for data units in the storage region 910 and/or the cache region 920 storing the various items or data objects. Additionally or alternatively, the storage journal 930 can be used by the storage device 900 to track which data units in the storage region 910 contain data units that have been invalidated by data units stored in the cache region 920. For example, the storage journal 930 can track associations between LBAs and PBAs for overwriting data units in the cache region 920 and PBAs for invalidated data units in the storage region 910.

The storage device 900 is configured to sequence data units in the cache region 920 and to write the sequenced data units to the storage region 910 using one or more sequential access write operations.

Figure 10:
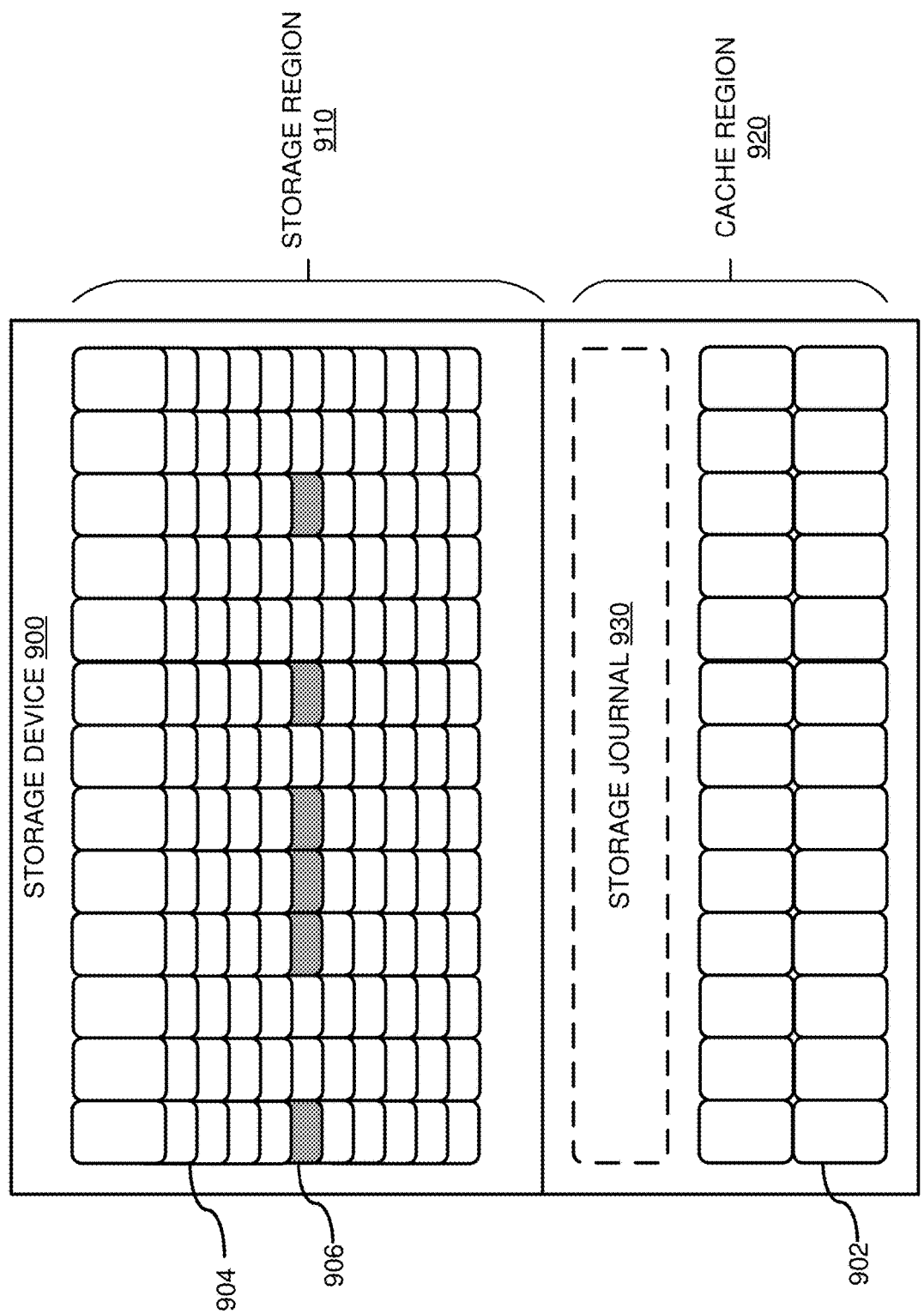
FIG. 10 is a system diagram showing the example storage device 900 configured to sequence data blocks in a cache region of a storage device and move the sequenced data blocks to a storage region of the storage device.

FIG. 10 is a system diagram showing the example storage device 900 configured to sequence data blocks (e.g., 906) in the cache region 920 of the storage device 900 and move the sequenced data blocks to the storage region 910 of the storage device 900. In FIG. 10, the previously cached data units have been transferred to the storage region 910. The storage device 900 can be configured to write the cached data units to the locations in the storage region that were occupied by the invalidated data units. For example, data unit 906, which invalidated the data unit 908 (shown in FIG. 9), is written to the location in the storage region 910 that was previously occupied by data unit 908.

In embodiments where the storage journal 930 is stored in the cache region 920, the storage journal 930 can be analyzed to identify the sequence of storage locations (such as PBAs) associated with the cached data blocks. After the transfer of data units to the storage region 920 is complete, the storage journal 930 can be updated to reflect the new locations of data units associated with identifiers of tracked data items or data objects in the storage region 910. In embodiments where the storage journal 930 is used to track which data units in the storage region 910 contain data units that have been invalidated by data units stored in the cache region 920, after the transfer is complete, the storage journal 930 can be updated to indicate that the data units in the storage region 920 are no longer invalidated.

Since the data units in the storage region 910 are stored using an SMR format, in some cases updating data units in place requires that adjacent data units be rewritten as well. Instead of transferring each data unit in the cache region 920 to the storage region 910 as a separate random access write operation, the overall performance of the transfer can be improved in some cases by sequencing the data units to be transferred based on the locations in the storage region 910 where they will be written and writing the sequenced data to the storage region 910 as a sequential access write operation. In cases where the sequenced data units are not consecutive (as is depicted in FIG. 10), intervening data units can be copied from the storage region 910 into the sequence. Once the sequence of data units is complete, the sequence can be written to the storage region 910.

In some embodiments, the storage device 900 is configured to detect when a specified number of data units in a track or sector of the storage region 910 have been invalidated by data units in the cache region 920 and overwrite the track or sector with the sequenced data units from the cache region 920. The specified number can be a percentage of the data units stored in a track or sector that represents a point at which sequencing the data units in the cache region to overwrite the track or sector becomes cost effective.

In a different or further embodiment, the storage device 900 is configured to transfer all data units currently stored in the cache region 920 to the storage region 910 using one or more sequential access write operations. The cached data units can be sequenced into one or more sequences of data units that are then written to the storage region 910. In at least one embodiment, the cached data units are organized into sequences in such a way as to minimize the number of intervening data units that have to be copied from the storage region 910 and rewritten to the storage region 910.

Figure 11:
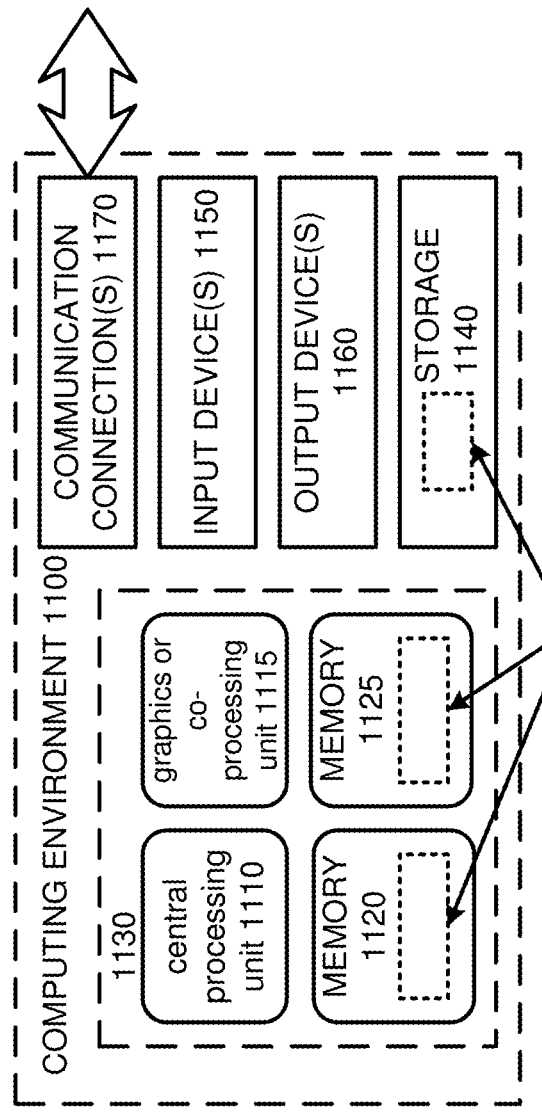
FIG. 11 depicts a generalized example of a suitable computing environment in which the described innovations may be implemented.

FIG. 11 depicts a generalized example of a suitable computing environment 1100 in which the described innovations may be implemented. The computing environment 1100 is not intended to suggest any limitation as to scope of use or functionality, as the innovations may be implemented in diverse general-purpose or special-purpose computing systems. For example, the computing environment 1100 can be any of a variety of computing devices (e.g., desktop computer, laptop computer, server computer, tablet computer, etc.).

With reference to FIG. 11, the computing environment 1100 includes one or more processing units 1110, 1115 and memory 1120, 1125. In FIG. 11, this basic configuration 1130 is included within a dashed line. The processing units 1110, 1115 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 11 shows a central processing unit 1110 as well as a graphics processing unit or co-processing unit 1115. The tangible memory 1120, 1125 may be volatile memory (e.g., registers, cache, RAM), non-volatile memory (e.g., ROM, EEPROM, flash memory, etc.), or some combination of the two, accessible by the processing unit(s). The memory 1120, 1125 stores software 1180 implementing one or more innovations described herein, in the form of computer-executable instructions suitable for execution by the processing unit(s).

In some embodiments, computing environment 1100 can be used as an example host computer as described herein.

A computing system may have additional features. For example, the computing environment 1100 includes storage 1140, one or more input devices 1150, one or more output devices 1160, and one or more communication connections 1170. An interconnection mechanism (not shown) such as a bus, controller, or network interconnects the components of the computing environment 1100. Typically, operating system software (not shown) provides an operating environment for other software executing in the computing environment 1100, and coordinates activities of the components of the computing environment 1100.

The tangible storage 1140 may be removable or non-removable, and includes magnetic disks, magnetic tapes or cassettes, CD-ROMs, DVDs, or any other medium which can be used to store information in a non-transitory way and which can be accessed within the computing environment 1100. The storage 1140 stores instructions for the software 1180 implementing one or more innovations described herein. In some embodiments, storage 1140 comprises one or more of the example storage devices as described herein.

The input device(s) 1150 may be a touch input device such as a keyboard, mouse, pen, or trackball, a voice input device, a scanning device, or another device that provides input to the computing environment 1100. The output device(s) 1160 may be a display, printer, speaker, CD-writer, or another device that provides output from the computing environment 1100.

The communication connection(s) 1170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), a data center, or other such network) using one or more network computers. A computer-readable storage medium can be a storage device, as described herein.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, assembly language, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), microprocessors, etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means. *The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A system comprising:
a server computer comprising a storage service configured to:
organize multiple storage devices, comprising a first storage device and a second storage device, into storage device clusters,
manage metadata for the storage device clusters,
identify a storage device cluster that matches requirements for a data write request using the metadata for the storage device clusters,
determine that a host computer is connected to storage devices in the identified storage device cluster, and
transmit the data write request to the host computer; and
the host computer comprising a data access scheduler configured to:
receive the request to store data,
determine that there is space in a buffer zone in the first storage device to store the data,
write the data to the buffer zone of the first storage device;
receive another request to store additional data,
determine that there is not space in the buffer zone of the first storage device to store the additional data and that there is space in a buffer zone of the second storage device to store the additional data,
write the additional data to the buffer zone of the second storage device, and schedule the first storage device to transfer the data stored in the buffer zone of the first storage device to a storage zone of the first storage device.

2. The system of claim 1, further comprising multiple host computers connected to the multiple storage devices, wherein the host computer is one of the multiple host computers, and wherein the multiple host computers are configured to:
- receive data write requests from the storage service; and
- write data contained within the data write requests to buffer zones of storage devices connected to the host computers that are in the identified storage device cluster.

3. The system of claim 2, wherein the storage service is further configured to:
- determine that the data write request comprises a data object;
- generate multiple different data shards based on the data object; and
- transmit the multiple different data shards in the data write requests received by the host computers.

4. The system of claim 1, wherein the multiple storage devices are configured to:
- monitor utilization of their respective buffer zones; and
- transmit buffer utilization notifications to the data access scheduler.

5. The system of claim 1, wherein a storage device of the multiple storage devices comprises a storage index, stored in a buffer zone of the storage device, that maps identifiers of data items stored in a storage zone of the storage device to locations within the storage zone where the data items are stored.

6. The system of claim 1, wherein the data access scheduler comprises storage device attributes for the first and second storage devices and is further configured to:
- query the first and second storage devices for storage performance and capacity information; and
- generate the storage device attributes based on the storage performance and capacity information.

7. The system of claim 6, wherein the data access scheduler is further configured to:
- match the request to write data to the first storage device based on capacity and performance requirements of the request and the storage device attributes.

8. One or more non-transitory computer-readable storage media storing instructions that, when executed by a computer, cause the computer to perform operations, the operations comprising:
- organizing multiple storage devices, comprising a first storage device and a second storage device, into storage device clusters;
- managing metadata for the storage device clusters;
- identifying a storage device cluster that matches requirements for a data write request using the metadata for the storage device clusters;
- identifying a host computer that is connected to storage devices in the identified storage device cluster;
- transmitting the data write request to the identified host computer;
- receiving, by the host computer, the request to store data;
- determining, by the host computer, that there is space in a buffer zone in the first storage device to store the data;
- writing, by the host computer, the data to the buffer zone of the first storage device;
- receiving, by the host computer, another request to store additional data;
- determining, by the host computer, that there is not space in the buffer zone of the first storage device to store the additional data and that there is space in a buffer zone of the second storage device to store the additional data;
- writing, by the host computer, the additional data to the buffer zone of the second storage device;
- scheduling, by the host computer, the first storage device to transfer the data stored in the buffer zone of the first storage device to a storage zone of the first storage device; and
- tracking, by the host computer, the transfer of the data stored in the buffer zone of the first storage device to a storage zone of the first storage device by receiving status messages from the first storage device.

9. The one or more computer-readable storage media of claim 8, wherein the operations further comprise:
- determining that the data write request comprises a data object;
- generating multiple different data shards based on the data object; and
- transmitting multiple data write requests comprising the different data shards to multiple host computers.

10. The one or more computer-readable storage media of claim 8, wherein the operations further comprise:
- monitoring utilization rates of buffer zones of the multiple storage devices; and
- transmitting buffer utilization notifications based on the utilization rates.

11. The one or more computer-readable storage media of claim 8, wherein the operations further comprise:
- storing a storage index in the buffer zone of the first storage device, wherein the storage index maps identifiers of data items stored in the storage zone of the first storage device to locations within the storage zone where the data items are stored.

12. The one or more computer-readable storage media of claim 8, wherein the operations further comprise:
- querying the first and second storage devices for storage performance and capacity information; and
- generating storage device attributes for the first and second storage devices based on the storage performance and capacity information.

13. The one or more computer-readable storage media of claim 12, wherein the operations further comprise:
- matching a request to store data to the first storage device based on capacity and performance requirements of the request and the storage device attributes.

14. A computing device comprising a processor configured to:
- query a first storage device and a second storage device for storage performance and capacity information;
- generate storage device attributes for the first and second storage devices based on the storage performance and capacity information;
- receive a request to store data;
- match the request to store data to the first storage device based on capacity and performance requirements of the request and the storage device attributes;
- determine that there is space in a buffer zone in the first storage device to store the data;
- write the data to the buffer zone of the first storage device;
- receive another request to store additional data;
- determine that there is not space in the buffer zone of the first storage device to store the additional data and that there is space in a buffer zone of the second storage device to store the additional data;
- write the additional data to the buffer zone of the second storage device; and schedule the first storage device to transfer the data stored in the buffer zone of the first storage device to a storage zone of the first storage device.

15. The computing device of claim 14, wherein the processor is further configured to:

monitor utilization rates of buffer zones of the first and second storage devices; and generate buffer utilization notifications based on the utilization rates.

\* \* \* \* \*